Patented Apr. 1, 1941

2,236,544

UNITED STATES PATENT OFFICE 2,236,544

PROCESS OF XANTHATING CELLULOSE ETHERS

Robert W. Maxwell, Wilmington, Del., assignor to E. I. du Pont de Nemours & Company, Wilmington, Del., a corporation of Delaware No Drawing. Application February 16, 1938,
Serial No. 190,700

13 Claims. (Cl. 260—226)

This invention relates to new low substituted cellulose ethers and the production of films, filaments, and other shaped objects therefrom. More particularly it relates to the solution and regeneration of cold caustic soda insoluble very low substituted cellulose ethers.

Low substituted cellulose ethers soluble in alkali have been known for many years. Such products when regenerated possess the unique property of a remarkably greater affinity for direct dyes than regenerated cellulose. The usual method of producing formed objects from cellulose ethers, namely solution in caustic soda followed by coagulation in a desired shape, has not permitted the production of formed objects with physical characteristics acceptable for many purposes.

It was shown by Denham & Woodhouse (Journal of the Chemical Society 105, 2362; 103, 1735; 119, 77) that cellulose ethers could be made into the corresponding xanthates and regenerated therefrom.

Unfortunately and in spite of the intensive and extensive work on this subject over a number of years, no one has been able to operate that or any other process for producing shaped products of said alkali soluble low substituted cellulose ethers on a commercial scale, and as a result such products have never been exploited commercially.

The products regenerated from xanthated alkali soluble low substituted cellulose ethers possess such a low wet and gel strength that they cannot compete with rayon (regenerated cellulose). Apparently the trade has found it more desirable to put up with, or use some special treating method for overcoming, the poor affinity of rayon for certain classes of dyes, than to contend with the problems involved in the dissolving and regenerating of such cellulose ethers.

It has been found as a result of experience that alkali soluble (even in the cold) low substituted cellulose ethers are quite unsuited for commercial exploitation for other reasons than those abovementioned. For example, the alkali soluble cellulose ethers which have been proposed for xanthation are subject to gelatinization by the steeping caustic. Gelatinization interferes to a marked extent with uniform contact with the carbon bisulfide. As a result such xanthated products are not acceptable for spinning because of unsatisfactory solubility and lack of uniformity.

This invention had for an object the xanthation and regeneration of very low substituted caustic soda insoluble (at any temperature) cellulose ethers by commercially practical procedures. Other objects were the regeneration of low substituted cellulose ethers in sheets and various other forms having good wet strength, the regeneration of very low substituted cellulose ethers in sheets and various other forms having good gel strength, the preparation of films and filaments having unique dyeing characteristics, the preparation of films and filaments having great affinity for direct dyes, the preparation of regenerated very low substituted cellulose ethers having desirable physical properties, the preparation of regenerated very low substituted cellulose ethers having attractive softness, the preparation of threads and sheets of very low substituted cellulose ethers capable of withstanding repeated wetting (for example, laundering) without damage, the preparation of xanthated cellulose ethers capable of being dissolved in dilute caustic soda solution and capable of being precipitated therefrom when passed through an acid bath to produce a shaped article having satisfactory dyeing characteristics (for example, in comparison with regenerated cellulose), the preparation of xanthated cellulose ethers capable of being dissolved in dilute caustic soda solution and capable of being precipitated therefrom when passed through an acid bath and having satisfactory wet strength and desirable wet/dry strength ratio (for example, in comparison with the xanthated low substituted cellulose ethers heretofore known and/or proposed for such treatment), and the preparation of a novel cellulose ether.

It has now been found that very low substituted cellulose ethers within a certain very narrow range of degree of substitution and degree of degradation many be xanthated and dissolved to give a viscose type product which may be spun or cast into coagulating (for example, acid) baths by commercially practical procedures. In order that the products precipitated from the solutions of the xanthated very low substituted cellulose ethers may have the desired combination of properties, it is essential that the cellulose ethers not be substituted to the extent of more than 0.1 mol. In addition they must have the property of insolubility in 6% aqueous caustic soda solution at all temperatures above 0° C. A further requirement is that the substituent radical of the cellulose ether must be from an etherification agent which is capable of reacting with cellulose to produce an aqueous alkali soluble cellulose ether. These new alkali insoluble very low substituted cellulose ethers when regenerated have good wet and gel strength and yield products having outstanding dyeing characteristics. They are new to the art.

From the following description and specific examples in which are disclosed certain embodiments of the invention as well as details of what is believed to be the best mode for carrying out the invention, it will be apparent how the foregoing objects and related ends are accomplished. The quantities are given in parts by weight throughout the specification.

Example I

Glycol cellulose was prepared by steeping 160 parts of air dry cotton linters in 2000 parts of 18% sodium hydroxide for one hour at 20° C., pressing to 480 parts, shredding, ageing the resultant alkali cellulose for two days at 20° C., placing the aged material into a baratte, rotating the same while introducing 3 parts of ethylene oxide and terminating the reaction after one hour by evacuating the excess or unreacted ethylene oxide. To this glycol cellulose in the baratte there was added 60 parts of carbon disulfide and xanthation allowed to take place between 25° and 30° C. The xanthate was dissolved in dilute caustic soda to give a solution containing 7% glycol cellulose and 7% sodium hydroxide. After ripening to a sodium chloride index of 3, it was spun into a bath composed of 10% sulfuric acid, 20% sodium sulfate, 1% zinc sulfate and 6% glucose through a spinneret containing 40 holes of 0.004 inch. The bath travel was 30 inches, and the tension applied to the filament during the spinning was 15 grams. The yarn after washing, desulfuring, and bleaching possessed a dry tenacity of 1.55 grams per denier, a wet tenacity of 0.59 gram per denier, and dyed approximately ten times fuller with Pontamine Sky Blue 6 BX (C. I. 518) than a viscose yarn prepared by spinning a cellulose viscose under the same conditions. Analysis showed the low substituted cellulose ether used for xanthation to contain 0.06 glycol groups per glucose unit of cellulose. It was insoluble in dilute caustic soda solution even upon cooling.

Example II

Glycol cellulose was prepared by steeping 160 parts of air dry cotton linters for 1 hour in a large volume of 18% aqueous sodium hydroxide, pressing to 480 parts, and mixing in a shredder with 5 parts of ethylene chlorohydrin. After shredding for 2 hours at 25° C. the product was dumped into a beater and washed with water until substantially alkali free. It was insoluble in dilute caustic soda even upon cooling. The glycol cellulose fibers were then concentrated by filtration and the water content reduced by pressing to 60% (based on the wet mass). The wet press cake was introduced into a steeping bath composed of 25% sodium hydroxide and after thorough impregnation was centrifuged to 3.4 parts by weight per part of glycol cellulose. The centrifuged material was shredded and aged for 2 days at 20° C., after which it was xanthated in the manner used for xanthating cellulose. Filaments were prepared from the resulting viscose. They were found to resemble closely the products of Example I.

Example III

Glycol cellulose was prepared by steeping air dry cotton linters in a large amount of 18% sodium hydroxide, pressing to a ratio of 3, introducing the resulting alkali cellulose into a Werner-Pfleiderer shredder, and during the shredding operation adding 1 part of ethylene chlorohydrin for each 100 parts of cellulose. The shredded glycol cellulose-alkali mixture was aged as described above for 2 days at 20° C. The ether was found to be insoluble in dilute (7%) caustic soda even upon freezing. It was xanthated with 35 parts of carbon disulfide for every 100 parts of cellulose and was dissolved to give a viscose type solution containing 7% glycol cellulose and 7% sodium hydroxide. It was spun into a bath consisting of 10% sulfuric acid, 20% sodium sulfate, 1% zinc sulfate and 5% glucose. The filaments possessed essentially the same wet strength as the filaments prepared from cellulose viscose under the same conditions, but the affinity for Pontamine Sky Blue 6 BX was approximately doubled.

Example IV

Glyceryl cellulose was prepared by steeping in 18% sodium hydroxide 160 parts of sulfite cellulose, pressing to a ratio of 2.7, shredding while adding 7 parts of glycerol monochlorohydrin (carefully purified to exclude dichlorohydrin) into the shredder, and then ageing the resultant shredded alkali cellulose ether product for 48 hours at 20° C. The low substituted glyceryl cellulose prepared as described above was found to contain 0.03 glycerol group per glucose unit of the cellulose. It was insoluble in dilute caustic soda even upon cooling. The cellulose ether mixture was then xanthated with 35 parts of carbon disulfide per 100 parts of cellulose and the resulting xanthate dissolved to give a viscose type composition containing 6% cellulose and 6% sodium hydroxide. This viscose-like product ripened very much more rapidly than a corresponding cellulose viscose (probably on account of by-product glycerin). It was spun at a sodium chloride index of 3 into a bath composed of 10% sulfuric acid, 20% sodium sulfate, 1% zinc sulfate and 6% glucose under a tension of 15 grams. The filament possessed a dry tenacity of 1.38 grams per denier and a wet tenacity of 0.44 gram per denier and dyed approximately 11 to 12 times fuller with Pontamine Sky Blue 6 BX than a corresponding cellulose filament prepared under the same conditions from cellulose viscose. Another portion of the viscose type solution was spun into a bath of the aforementioned composition under a tension of 135 grams. The filament resulting under such conditions possessed a tenacity of 2.25 grams per denier in the dry state and 1.14 grams per denier in the wet state, with an affinity for Pontamine Sky Blue 6 BX of approximately 5 times that of the corresponding filament prepared from ordinary viscose under the same conditions. The ratio of wet and dry strength of the higher tenacity filaments was 0.503 compared with 0.530 for control filaments spun under the same conditions using viscose made from sulfite cellulose.

Example V

Ethyl cellulose was prepared by steeping 160 parts of high alpha wood cellulose in (an excess of) 18% sodium hydroxide for 1 hour at 25° C., pressing to a ratio of 3, placing in a shredder and adding 10 parts of diethyl sulfate while shredding. After thorough mixing, the alkali cellulose etherification mixture was placed in ageing cans and allowed to age and react for 48 hours at 25° C. It was insoluble in dilute caustic soda even upon cooling. The cellulose ether alkali mixture was xanthated in the usual manner and spun into filaments at a sodium chloride index of 3. The resulting filaments were found to have a ratio of wet to dry strength of about 0.4, and to dye approximately 5 times as full with Pontamine Sky Blue 6 BX as the cellulose filaments prepared from viscose regenerated under the same conditions.

Example VI

Methyl cellulose was prepared by dissolving 100 parts of sodium methyl sulfate in 2000 parts of 18% sodium hydroxide, steeping 160 parts of air dry cotton linters therein for 1 hour at 25° C., pressing the resultant alkali cellulose to a ratio of 3 and allowing it to age for 72 hours at 25° C. It was insoluble in dilute caustic soda even upon cooling. The aged product was then shredded and xanthated at once with 35 parts of carbon disulfide per 100 parts of methyl cellulose. The xanthate was dissolved, ripened, and spun into filaments. The resulting yarn possessed a wet strength almost equivalent to that of an artificial silk prepared under the same conditions from cellulose viscose, but it possessed a much greater affinity for Pontamine Sky Blue 6 BX.

Example VII

Methyl cellulose was prepared by steeping 160 parts of air dry cotton linters for 1 hour at 25° C. in 1600 parts 18% sodium hydroxide solution, pressing to a ratio of 3, placing in a shredder and spraying in 6 parts of dimethyl sulfate during the shredding operation. After the shredding was completed, the alkali (methyl) cellulose was dumped into ageing cans and stored for 48 hours at 20° C. A test portion of the product at that time was found to be insoluble in 10% caustic soda solution even upon cooling. Analysis of the product showed it to contain 0.045 methyl group per glucose unit of the cellulose. The mixture was then xanthated with 35 parts of carbon disulfide per 100 parts of methyl cellulose, after which the xanthate was dissolved and spun into filaments. The resulting filaments had a wet strength approaching that of cellulose viscose rayon, and the affinity for Pontamine Sky Blue 6 BX (C. I. 518) was four times as great.

Example VIII

Cellulose glycolic acid was prepared by steeping 160 parts of cotton linters in 2000 parts of 18% caustic soda for 1 hour at 25° C., placing in a shredder and mixing during the shredding operation with 6 parts of sodium chloroacetate. The sodium chloroacetate was added as a fine powder through a sifter to insure a uniform and thorough distribution. The reaction mixture was then dumped from the shredder into alkali cellulose ageing cans and aged for 48 hours at 20° C. A test sample of the very low substituted cellulose ether at that time was found to be insoluble in 10% sodium hydroxide solution, even upon chilling (to −10° C.). The aged product was then xanthated with 35 parts carbon disulfide for each 100 parts of cellulose glycolic acid, after which the xanthate was dissolved into a solution containing 7% cellulose and 5% sodium hydroxide. The resulting viscose type composition was ripened and spun into filaments. After the yarn had been purified in the manner customary in the rayon art utilizing the usual alkaline desulfuring and bleaching agents, it was given a quick acid wash with sodium bisulfate solution followed by thorough washing with water to decompose all traces of cellulose glycolic acid sodium salt. This procedure has been found desirable because the yarn in the form of a sodium salt is very weak when wet. The resulting free acid type product had a ratio of wet to dry yarn strength of approximately 0.4. After heating at 120° C. for 6 hours, the ratio of wet to dry strength was approximately 0.50, or substantially the same as that of cellulose viscose rayon prepared in the same manner.

The new cellulose ethers of this invention are ordinarily prepared by the etherification of such cellulosic raw materials as cotton, cotton linters, high alpha wood cellulose, purified wood cellulose, purified cotton cellulose, and the like. As will be clear to those skilled in the art, other sources of cellulose are not excluded. It is only necessary that the raw material have a degree of polymerization sufficiently high so that alkali insoluble cellulose ethers can be prepared therefrom.

Mixtures of celluloses may be employed in carrying out the invention. In such instances the mixture of celluloses can be etherified together or separately. In the case of separate etherification, the different ethers may be mixed before xanthation and xanthated together or they may be xanthated separately and mixed at any convenient time after xanthation. Mixtures of etherifying agents can be used in order to secure mixed cellulose ethers.

Briefly, the procedure for making these new ethers of cellulose consists of a controlled degradation and etherification of cellulose, the etherification and degradation being allowed to proceed until a low-substituted ether is formed but being discontinued before the product becomes soluble even in cold alkali and before more than 0.1 ether groups per glucose unit of cellulose have been introduced.

The substituent radical in the cellulose ether preferably belongs to such groups as alkyl, hydroxy alkylene, hydroxy (oxy) paraffin carboxylic acids (oxy aliphatic acids), and the like. Alkyl radicals of low carbon content, hydroxy alkyl (alphyl) (alkylene) groups of low carbon content, and carboxy alkyl (alphyl) (alkylene) groups of low molecular weight such as methyl, ethyl, glycol, propylene glycol, isobutylene glycol, cyclohexene glycol, glyceryl, methoxyethyl, ethoxy ethyl, glycolic acid, and the like, are especially desirable. As a rule any low molecular weight etherifying radical which when introduced into celulose in moderate amounts gives a cellulose ether which is soluble in dilute caustic soda solution may be used. Final products of very high wet strength have been obtained from ethers prepared by etherification with ethylene oxide, propylene oxide, ethylene chlorohydrin and propylene chlorohydrin.

In general for a given degree of substitution, alkyl etherifying radicals reduce wet strength less than ether radicals containing hydroxyl or carboxyl groups. The larger the proportion of such oxygen containing groups the greater the reduction in wet strength. This is shown by the fact that glyceryl radicals reduce wet strength more than glycol radicals, and that propylene glycol radicals reduce wet strength less than glycol radicals. These variations in wet strength are, however, of a minor character as compared to the improvements effected by lowering the degree of substitution.

In preparing the celulose ethers of this invention, the cellulosic raw material is treated with the etherifying agent, preferably in the presence of caustic alkali. The cellulose ethers need not be prepared by the reaction of etherifying agents on alkali cellulose. Other processes such as steeping cellulose in an etherifying agent solution followed by treatment with alkali and a continuous process involving impregnation of cellulose with solutions of etherifying agents in alkali, may be satisfactorily used. Generally speaking, any known etherification procedure is satisfactory providing it is capable of being so regulated that the degree of substitution does not exceed 0.1 mol per glucose unit and the degree of degradation may be so limited and coordinated with the degree of substitution that the product remains alkali-insoluble even in the cold.

The quantity of etherifying agent used depends upon the particular etherifying agent and the conditions of etherification. Most etherifying agents have been found very efficient for use according to the present invention wherein low degrees of substitution are involved, and their action is often such as to give almost a theoretical yield of cellulose etherification. For this reason it may be stated that in general the amount of etherifying agent used will roughly approximate the degree of substitution desired. This factor can readily be determined empirically.

The xanthation of the cellulose ethers may be conducted in the same general way as the xanthation of cellulose. Preferably the ether is prepared and purified before the caustic alkali steeping which takes place in connection with xanthation. This procedure is especially desirable where by-products from the etherification step exert a deleterious action on the viscose-like product. This point is further illustrated by the preparation of hydroxy alkyl cellulose in which by-product polyatomic alcohols are always present in the reaction mixture. Such alcohols accelerate the ripening of viscose considerably, and if present in large proportions, make ripening control exceedingly difficult.

Convenience of operation is an important feature in xanthation, and on this basis a desirable method of preparing the celulose ether xanthate is to make an alkali cellulose using 15%–25% sodium hydroxide, and then etherify the resulting alkali cellulose by the introduction of the etherifying agent during the shredding operation, or better yet, by adding the etherifying agent to the baratte or related apparatus used for the xanthation step. After this etherification reaction is completed or has proceeded to the desired extent, the xanthation is carried out on the etherification reaction mass.

The xanthation may advantageously take place at low temperatures. If the xanthation is carried out at room temperature or higher, the quantity of carbon disulfide employed may sometimes be reduced.

The formation of the solution of the xanthated cellulose ether may be carried out at any desired temperature, for example, room temperatures and low temperatures.

Ripening of the xanthated cellulose ether may be effected in much the same way as the ripening of cellulose xanthate.

It is possible to mix viscose with the xanthates of the cellulose ethers. Such a procedure is especially applicable for small effects where dyeing characteristics are desired. In such instances low proportions of the xanthated cellulose ether (less than 25%) are particularly useful since the products regenerated from such a mixture are of almost the same wet strength as regenerated cellulose.

The spinning (and like operations) of the xanthated cellulose ethers may utilize any of the normal ordinary baths known in the viscose art. The products of this invention are especially suited for the preparation of high tenacity rayon-like products using devices in the spinning bath adapted to introduce tension during the regeneration step or using plasticizing baths coupled with the application of tension. Plasticizing baths consisting mostly of sulfuric acid of above 35% concentration give excellent results, particularly when the bath is maintained at temperatures of 20° C. Products of unusual softness and very good wet strength are produced by the use of plasticizing baths. With high sulfuric acid concentration baths it is desirable to use a high viscosity solution of the xanthated cellulose ether.

Purification of the yarn or other regenerated products of this invention is carried out in essentially the same way as the purification of cellulose regenerated from viscose. Where the cellulose ether has not been purified before xanthation, it sometimes happens that by-products are somewhat more difficult to remove than is the case with regenerated cellulose. This is not a critical matter, however, since making the purification step a little more drastic effects satisfactory elimination of by-products.

In general the cellulose ethers which have been found suitable for xanthation according to the present invention are those which: (1) are substituted up to 0.1 mol and preferably from 0.01 to 0.1 mol per glucose unit of the cellulose, (2) are insoluble in dilute caustic soda even in the cold, and (3) may be converted to a form soluble in dilute caustic soda by further etherification which effects the introduction of more of the same substituent radical.

As will be obvious, these cellulose ethers which are xanthated according to this invention are new. The previously known cellulose ethers having the same ether-forming radical and the same degree of substitution have been soluble in dilute sodium hydroxide, and the previously known ethers having the same ether-forming substituent which were alkali insoluble had a higher degree of substitution resulting in solubility in water or organic solvents. It is easily demonstrated that the very low substituted dilute caustic soda-insoluble cellulose ethers used according to this invention give, after xanthation, regenerated products different from the heretofore known cellulose ethers. Comparisons of wet strength and affinity of the regenerated products for dyestuffs leave no doubt that a chemical and/or physical difference exists. In Table I below, properties of filaments of hydroxy alkyl cellulose ethers produced by spinning solutions of xanthated hydroxy alkyl cellulose ethers into a bath of low acid concentration without the application of unusual tension, are compared. Attention is called to the fact that the wet strength of the products regenerated from the cold alkali insoluble very low substituted cellulose ethers is only slightly lower than that of regenerated cellulose, whereas the affinity for direct dyes is retained to a marked degree. It is also to be noted that the wet strength of the more soluble or more highly substituted ethers is decidedly lower. This is surprising since it would be expected that the affinity of dyestuffs would decrease in direct ratio with the degree of substitution, and increase in wet strength. This discovery makes it possible to obtain desirable dyeing characteristics similar to those claimed for the prior art products regenerated from the previously known xanthated cellulose ethers without at the same time taking on their undesirable characteristics, such as low wet strength.

Table I

| Cellulose ether | Ether groups present per glucose unit | Tenacity in grams per denier Dry | Tenacity in grams per denier Wet | Ratio of wet to dry strengths | Affinity for Pontamine Sky Blue 6 BX (C. I. 518) |
|---|---|---|---|---|---|
| Control (cellulose) | 0 | 1.71 | 0.81 | 0.474 | 1 |
| Glyceryl | .03 | 1.38 | 0.44 | 0.319 | 11-12 |
| Glycol | .06 | 1.49 | 0.59 | 0.396 | 10 |
| Do | .12 | 1.45 | 0.43 | 0.297 | 11-12 |
| Do.* | .20 | 1.35 | 0.24 | 0.178 | 13 |
| Propylene glycol* (very high viscosity) | .35 | 0.96 | 0.21 | 0.23 | 13 |

*Alkali soluble.

The properties of filaments regenerated from the xanthates of very low substituted cellulose alkyl ethers using a bath of low acid concentration without the application of unusual tension, are given in Table II. The behavior of the alkyl cellulose ethers parallels that of the glycol cellulose ethers mentioned in Table I.

Table II

| Cellulose ether | Ether groups present per glucose unit | Tenacity in grams per denier Dry | Tenacity in grams per denier Wet | Ratio of wet to dry strengths | Affinity for Pontamine Sky Blue 6 BX (C. I. 518) |
|---|---|---|---|---|---|
| Control (cellulose) | 0 | 1.71 | 0.81 | 0.474 | 1 |
| Methyl | 0.08 | 1.61 | 0.71 | 0.441 | 7 |
| Do.* | 0.20 | 1.43 | 0.49 | 0.342 | 10 |
| Ethyl | 0.07 | 1.49 | 0.64 | 0.429 | 6 |
| Do | 0.14 | 1.46 | 0.50 | 0.342 | 8 |
| Do.* | 0.50 | 1.79 | 0.25 | 0.140 | |

*Alkali soluble.

The properties of rayon-like filaments of higher tensile strength regenerated from very low substituted cellulose ethers by spinning into a bath of low acid concentration under high tension, is given in Table III. Here again it is shown that the ratio of wet to dry strength is considerably higher in the cellulose ethers of very low degrees of substitution, and that these products have substantially the same dyeing characteristics as higher substituted products.

Table III

| Cellulose ether | Ether groups present per glucose unit | Tenacity in grams per denier Dry | Tenacity in grams per denier Wet | Ratio of wet to dry strengths | Affinity for Pontamine Sky Blue 6 BX (C. I. 518) |
|---|---|---|---|---|---|
| Control (cellulose) | 0 | 2.55 | 1.35 | 0.530 | 1 |
| Glyceryl | 0.03 | 2.25 | 1.14 | 0.503 | 5 |
| Glycol | 0.06 | 2.32 | 1.15 | 0.496 | 8 |
| Do | 0.12 | 2.17 | 0.89 | 0.410 | 9 |
| Methyl* | 0.20 | 2.22 | 1.00 | 0.448 | 8 |
| Ethyl | 0.14 | 2.07 | 0.95 | 0.459 | 8 |

*Alkali soluble.

The low ratios of wet to dry strengths of the higher substituted products lying without the range of the present invention shown in Tables I, II and III above, should be particularly noted.

The invention is especially applicable to the preparation of high tenacity rayon-like filaments by the spinning of viscose-like solutions of this invention under tension, using baths of low acid concentration which are usually considered nonplasticizing. With such products a higher degree of wet strength is necessary even during the spinning operation when the high tension must be applied. The very low substituted cellulose ethers of this invention may be spun from the viscose-like solution of the cellulose ether xanthate at tensions under which higher substituted products cannot be spun at all. This is illustrated by the comparative figures given in Table IV

Table IV

| Cellulose ether | Mols ether group present per glucose unit | Maximum spinning tension possible |
|---|---|---|
| Propylene glycol cellulose | 0.35 | 80 grams. |
| Glycol cellulose | 0.06 | More than 135 grams. |

In general the greater the tension applied during the spinning of viscose the higher will be the tensile strength of the resulting rayon. This relation holds true with the products of this invention. It follows that if high tension cannot be applied during spinning (because of the properties of the regenerated product), yarns of tensile strength of the highest order cannot be produced.

The behavior of the specific products shown in the tables is typical of the products obtained by the xanthation solution and regeneration of very low substituted cellulose ethers.

Products insoluble in alkalies (or other solvents which do not dissolve cellulose itself) are obtained by regulating the degree of degradation and etherification of the cellulose. Thus by maintaining either a very high degree of polymerization (non-degradation) of the cellulose or by effecting only a very low degree of substitution, alkali-insoluble ethers result. If it is desired to make a product of comparatively high degree of substitution (yet containing less than 0.1 ether group per glucose unit of the cellulose), the reaction is carried out under conditions which result in very slight degradation or a starting cellulose of very high molecular weight is used. If degradation were allowed to occur to a sufficient degree, the resulting cellulose ether would be soluble in aqueous caustic soda solutions. Likewise, if it is desired to prepare an alkali-insoluble cellulose ether of a higher degree of degradation, the cellulose is etherified only to a point which is still insufficient to render the product soluble in caustic soda solution. It is characteristic of these cellulose ethers that they can be converted to a form which is soluble in alkali by either or both of further degradation and etherification to a higher degree by introduction of the same ether radical.

The most important requirement of the cellulose ethers for the present process is that they shall be insoluble in alkalies. If the degree of substitution is increased to above 0.1 mol, the wet strength of the product becomes undesirably low even though the starting cellulose ether may be alkali-insoluble. This is particularly true of the glycol ethers of cellulose produced by the action of alkylene oxides on cellulose in the presence of tertiary amines. These can be made of a comparatively high degree of substitution (greater than 0.1 mol) without becoming soluble in alkalies, but such cellulose ethers after xanthating, dissolving and regenerating are of low wet strength in comparison with those which are substituted to less than 0.1 mol. Likewise, ethers which owe their insolubility to poor uniformity give products of poor wet strength when xanthated, dissolved, and regenerated. For this reason the limit has been set at 0.1 mol ether group per glucose unit, since in general above this degree of substitution wet strength is so low that products even though cold alkali-insoluble are not practically usable for the same purposes or in the same processes as regenerated cellulose.

While the invention is applicable to alkali-insoluble ethers containing up to 0.1 ether groups per glucose unit of the cellulose and the range of .02 to .075 is of considerable interest, its greatest utility lies with the products of very low degree of substitution containing less than 0.05 ether radicals per glucose unit of the cellulose. In general products within the latter range of substitution, particularly cellulose alkyl ethers, are of a sufficiently high wet strength that they cannot be distinguished from cellulose viscose regenerated products in ordinary usage, yet the dyeing characteristics have been altered sufficiently to give unique effects. The invention is especially applicable to very low substituted ethers containing in the neighborhood of 0.01 mol of ether groups per glucose unit of the cellulose, since within these ranges the procedure can be used for adjusting the dyeing characteristics of viscose rayon caused by changes in spinning conditions. A typical case of this sort is furnished by high tenacity viscose rayon. High tenacity rayons prepared by spinning viscose under considerable tension exhibit a reduced affinity for direct dyes. To overcome this it has been proposed to subject cellulose to various swelling treatments. These are expensive. The reduced affinity for dyes is objectionable since it makes necessary the use of special dye baths for this type of rayon. By etherifying the cellulose to a very low degree before xanthation this difficulty may be overcome. A very practical operating method of accomplishing the result is to add a small quantity of etherifying agent such as dimethyl sulfate or ethylene chlorohydrin to the shredder during the shredding of the alkali cellulose.

Heretofore it was believed that a satisfactory xanthation and regeneration of purified cellulose ethers was not practical. This belief had a basis in fact, since the degree of substitution and alkali solubility of the cellulose ethers heretofore proposed for xanthation has rendered such subject to gelatinization by the steeping caustic, with the result that the product took on a physical form not suitable for the xanthation step. It is difficult to mix carbon disulfide uniformly with such products, and as a result xanthates of extremely poor solubility are formed. Quite the contrary is the case with the products of the present invention. The very low substituted caustic alkali insoluble cellulose ethers are substantially unaffected by the caustic of steeping concentration, and retain the physical form of the starting cellulose. As a result, they are as easily xanthated as cellulose itself, so that xanthates of good solubility are obtained. Such a product permits the use of a minimum quantity of carbon disulfide, so that a further advantage is present.

Another important advantage of the invention lies in the reduced cost of reagents (over the processes of the prior art). Less etherifying agent is required to introduce the low proportion of substituent (of the present invention) than the larger quantities used by previous workers. The advantage is even greater than is at first evident, since small quantities of etherifying reagents act more efficiently than large quantities. In cases where costs of material are an important item, the differences in cost between the present and prior art processes may be sufficient to determine between commercial practicability and impracticability.

The products of this invention are generally applicable for all those uses to which viscose or regenerated cellulose have previously been put. The higher wet strength of the products gives them a wider range of application than the xanthated cellulose ethers of the prior art (which had a higher degree of etherification). The viscose-like solutions of the invention are particularly suited for textile sizing since they give finishes which are considerably more laundry-fast than corresponding finishes obtained from higher substituted cellulose ethers. Viscose-like solutions of the invention have a high degree of usefulness for printing textiles because of the great difference in dyeing which results when the textiles so printed are introduced into direct dye baths. Other uses include the coating of fabrics and bookcloth, the manufacture of artificial sponge, sausage casings, fruit coatings, bottle caps, bands, plastic compositions, fillers, adhesives, etc.

Films, filaments, etc., of the regenerated products of this invention may be given after-treatments to still further improve their properties. They may be rendered water-repellent by esterification. In most instances they may be esterified simply by boiling with suitable acid anhydride for a short period of time. Yarns obtained from the regenerated glycol cellulose of this invention which have been refluxed for half an hour with an anhydride of an acid such as butyric, isobutyric, or acetic, contain up to one ester group or more per glucose unit of cellulose and are of high melting point, or do not melt yet are insoluble in organic solvents.

As many apparently widely different embodiments of this invention may be made without departing from the spirit and scope thereof, it is to be understood that I do not limit myself to the specific embodiments thereof except as defined in the appended claims.

I claim:

1. The process which comprises xanthating a cellulose ether which is insoluble in 6% aqueous caustic soda, which contains not more than 0.1 ether group per glucose unit of the cellulose, and which can be converted to a 6% aqueous caustic soda soluble form by increasing the amount of the substituent radical present in the cellulose ether, dissolving said xanthate in dilute caustic alkali and thereafter regenerating the said cellulose ether.

2. The product obtained by the process which comprises xanthating a cellulose ether which is insoluble in 6% aqueous caustic soda, which contains not more than 0.1 ether group per glucose unit of the cellulose, said insoluble cellulose ether having been prepared by reacting cellulose with an etherifying agent capable of forming and 6% aqueous caustic alkali soluble ether with cellulose, dissolving said xanthate in dilute aqueous caustic alkali and thereafter regenerating the said cellulose ether.

3. A low substituted ether of cellulose insoluble in aqueous caustic alkali even in the cold, containing up to 0.1 ether groups per glucose unit of cellulose, said insoluble ether containing a substituent radical from an etherifying agent capable of reacting with cellulose to produce an aqueous caustic alkali soluble cellulose ether.

4. The process which comprises xanthating a cellulose ether which is insoluble in 6% caustic soda, which contains not more than 0.1 ether group per glucose unit of the cellulose, and which can be converted to a 6% caustic soda soluble form by increasing the amount of the substituent radical present in the cellulose ether, dissolving said xanthate in dilute aqueous caustic alkali and thereafter regenerating the said cellulose ether.

5. The product obtainable by the process which comprises xanthating a cellulose ether which is insoluble in 6% caustic soda, which contains not more than 0.1 ether group per glucose unit of the cellulose, said insoluble cellulose ether having been prepared by reacting cellulose with an etherifying agent capable of forming an alkali soluble ether with cellulose, dissolving said xanthate in dilute aqueous caustic alkali and thereafter regenerating the said cellulose ether.

6. The process which comprises xanthating an alkyl cellulose ether which is insoluble in dilute 6% caustic soda, which contains not more than 0.1 ether group per glucose unit of the cellulose, and which can be converted to a dilute caustic soda soluble form by increasing the amount of the substituent radical present in the cellulose ether, dissolving said xanthate in dilute aqueous caustic alkali and thereafter regenerating the said cellulose ether.

7. The process which comprises xanthating a cellulose ether of the group consisting of methyl cellulose and ethyl cellulose, which is insoluble in dilute 6% caustic soda, which contains not more than 0.1 ether group per glucose unit of the cellulose, and which can be converted to a dilute caustic soda soluble form by increasing the amount of the substituent radical present in the cellulose ether, dissolving said xanthate in dilute aqueous caustic alkali and thereafter regenerating the said cellulose ether.

8. The process which comprises xanthating an hydroxyalkyl-cellulose ether which is insoluble in dilute 6% caustic soda, which contains not more than 0.1 ether group per glucose unit of the cellulose, and which can be converted to a dilute caustic soda soluble form by increasing the amount of the substituent radical present in the cellulose ether, dissolving said xanthate in dilute aqueous caustic alkali and thereafter regenerating the said cellulose ether.

9. The process which comprises xanthating a cellulose glycolic acid ether which is insoluble in 6% dilute caustic soda, which contains not more than 0.1 ether group per glucose unit of the cellulose, and which can be converted to a dilute caustic soda soluble form by increasing the amount of the substituent radical present in the cellulose ether, dissolving said xanthate in dilute aqueous caustic alkali and thereafter regenerating the said cellulose ether.

10. A shaped regenerated cellulose ether of improved physical properties, wetting resistance, dyeing characteristics, wet strength and gel strength, which is produced by xanthating a cellulose ether which is insoluble in 6% caustic soda, which contains not more than 0.1 ether group per glucose unit of the cellulose, and which can be converted to a 6% caustic soda soluble form by increasing the amount of the substituent radical present in the cellulose ether, dissolving the said xanthate in dilute caustic soda, shaping the xanthate solution, and thereafter regenerating the said cellulose ether.

11. The product of claim 10 when the cellulose ether is a member of the group consisting of methyl and ethyl celluloses.

12. A low substituted ether of cellulose of the group consisting of unshaped and shaped regenerated cellulose ethers which are insoluble in aqueous caustic alkali even in the cold, which contain up to 0.1 ether groups per glucose unit of cellulose, said insoluble ether containing a substituent radical from an etherifying agent capable of reacting with cellulose to produce an aqueous caustic alkali soluble cellulose ether.

13. A regenerated shaped or unshaped cellulosic derivative of improved physical properties, wetting resistance, dyeing characteristics, wet strength and gel strength, produced by regenerating in shaped or unshaped form a xanthated cellulose ether, said cellulose ether before xanthation containing not more than .1 ether groups per glucose unit of cellulose and being insoluble even in the cold in 6% aqueous caustic alkali.

ROBERT W. MAXWELL.